United States Patent
Oka

(10) Patent No.: US 8,610,949 B2
(45) Date of Patent: Dec. 17, 2013

(54) COLOR FACSIMILE APPARATUS

(75) Inventor: Tomohide Oka, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 952 days.

(21) Appl. No.: 12/720,868

(22) Filed: Mar. 10, 2010

(65) Prior Publication Data

US 2011/0063635 A1 Mar. 17, 2011

(30) Foreign Application Priority Data

Sep. 17, 2009 (JP) ................. 2009-215946

(51) Int. Cl.
*H04N 1/40* (2006.01)
(52) U.S. Cl.
USPC .......................................... 358/1.9; 358/468
(58) Field of Classification Search
USPC ........... 358/1.9, 2.1, 400, 500, 406, 504, 402, 358/468
See application file for complete search history.

(56) References Cited

U.S. PATENT DOCUMENTS

| | | | | |
|---|---|---|---|---|
| 5,438,436 A | * | 8/1995 | Harris | 358/500 |
| 7,543,035 B2 | * | 6/2009 | Fujise et al. | 709/207 |
| 7,656,560 B2 | * | 2/2010 | Kasamatsu | 358/400 |
| 7,764,392 B2 | * | 7/2010 | Kumakura | 358/1.15 |
| 2004/0051899 A1 | | 3/2004 | Saitoh et al. | |

FOREIGN PATENT DOCUMENTS

| | | |
|---|---|---|
| JP | 11-112763 | 4/1999 |
| JP | 2001-156834 | 6/2001 |
| JP | 2002-103753 | 4/2002 |
| JP | 2004-112293 A | 4/2004 |
| JP | 2006-033043 | 2/2006 |

OTHER PUBLICATIONS

Japanese Office Action dated Dec. 15, 2011, filed in Japanese counterpart Application No. 2009-215946, 6 pages (with English translation).

* cited by examiner

*Primary Examiner* — Thomas D Lee
*Assistant Examiner* — Stephen M Brinich
(74) *Attorney, Agent, or Firm* — Patterson & Sheridan, L.L.P.

(57) ABSTRACT

According to one embodiment, a color facsimile apparatus includes a printer portion that performs color print and monochrome print of a received image of a color facsimile signal transmitted from a certain outgoing listed number, an outgoing detecting portion that receives the facsimile signal to detect the outgoing listed number, an image determination portion that determines whether the received image of the facsimile signal is a color image or a monochrome image, and a color print control portion that compares the outgoing listed number to listed numbers on a previously stored white list to restrict the color print of the received image when the outgoing listed number does not exist in the listed numbers on the white list.

9 Claims, 5 Drawing Sheets

COLOR FACSIMILE APPARATUS

CROSS-REFERENCE TO RELATED APPLICATION

This application is also based upon and claims the benefit of priority from Japanese Patent Application No. 2009-215946, filed on Sep. 17, 2009, the entire contents of all of which are incorporated herein by reference.

TECHNICAL FIELD

Exemplary embodiments described herein relate to a color facsimile apparatus that can perform monochrome print and color print.

BACKGROUND

Recently color copy machines that can perform color print become considerably common. However, a color print sheet is relatively expensive, and not the color print but monochrome print is frequently performed in the color copy machine to hold down expenses.

Color facsimile machines that can perform the color print are becoming increasingly common in the field of facsimile apparatus. However, the expensive color sheet and color ink are necessary to be also used in the color print. Accordingly, cost increases due to use of the color sheet for the color print when a facsimile signal is received. Particularly, facsimile communication via the Internet is also becoming common, and the facsimile communication that is unnecessary for a received side is printed. Accordingly, a large amount of expense is required when the facsimile communication is output in the expensive color print.

In order to solve the problem, for example, US Pub. No. 2004/0051899 discloses an image processing apparatus that controls automatic print of a received document for a color document. However, in the apparatus, how to control the performance of the automatic print is unclear when the color document is received.

SUMMARY

An aspect of the present disclosure relates to a color facsimile apparatus, containing: a printer portion that performs color print and monochrome print of a received image produced by a color facsimile signal transmitted from a certain outgoing listed number; an outgoing detecting portion that receives the facsimile signal to detect the outgoing listed number; an image determination portion that determines whether the received image produced by the facsimile signal is a color image or a monochrome image; and a color print control portion that compares the outgoing listed number to listed numbers on a previously stored first list to restrict the color print of the color image determined by the image determination portion when the outgoing listed number does not exist in the listed numbers on the first list.

Another aspect of the present disclosure relates to color facsimile apparatus, containing: a printer portion that performs color print and monochrome print of a received image produced by a color facsimile signal transmitted from a certain outgoing listed number; an outgoing detecting portion that receives the facsimile signal to detect the outgoing listed number; an image determination portion that determines whether the received image produced by the facsimile signal is a color image or a monochrome image; a first list comparing portion that compares the outgoing listed number to listed numbers on a previously stored first list to determine whether the outgoing listed number exists in the first list; a print number determination portion that counts the number of the color images; and a print control portion that receives output of the print number determination portion and output of the first list comparing portion to control the printer portion.

Further an aspect of the present disclosure relates to color facsimile apparatus, containing: a printer portion that performs color print and monochrome print of a received image produced by a color facsimile signal transmitted from, a certain outgoing listed number; an outgoing detecting portion that receives the facsimile signal to detect the outgoing listed number; an image determination portion that determines whether the received image produced by the facsimile signal is a color image or a monochrome image; a first list comparing portion that compares the outgoing listed number to listed numbers on a previously stored fist list to determine whether the outgoing listed number exists in the first list; a second list comparing portion that compares the outgoing listed number to listed numbers on a previously stored second list to determine whether the outgoing listed number exists in the second list; and a print control portion that receives output of the first list comparing portion and output of the second list comparing portion to control the printer portion.

DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
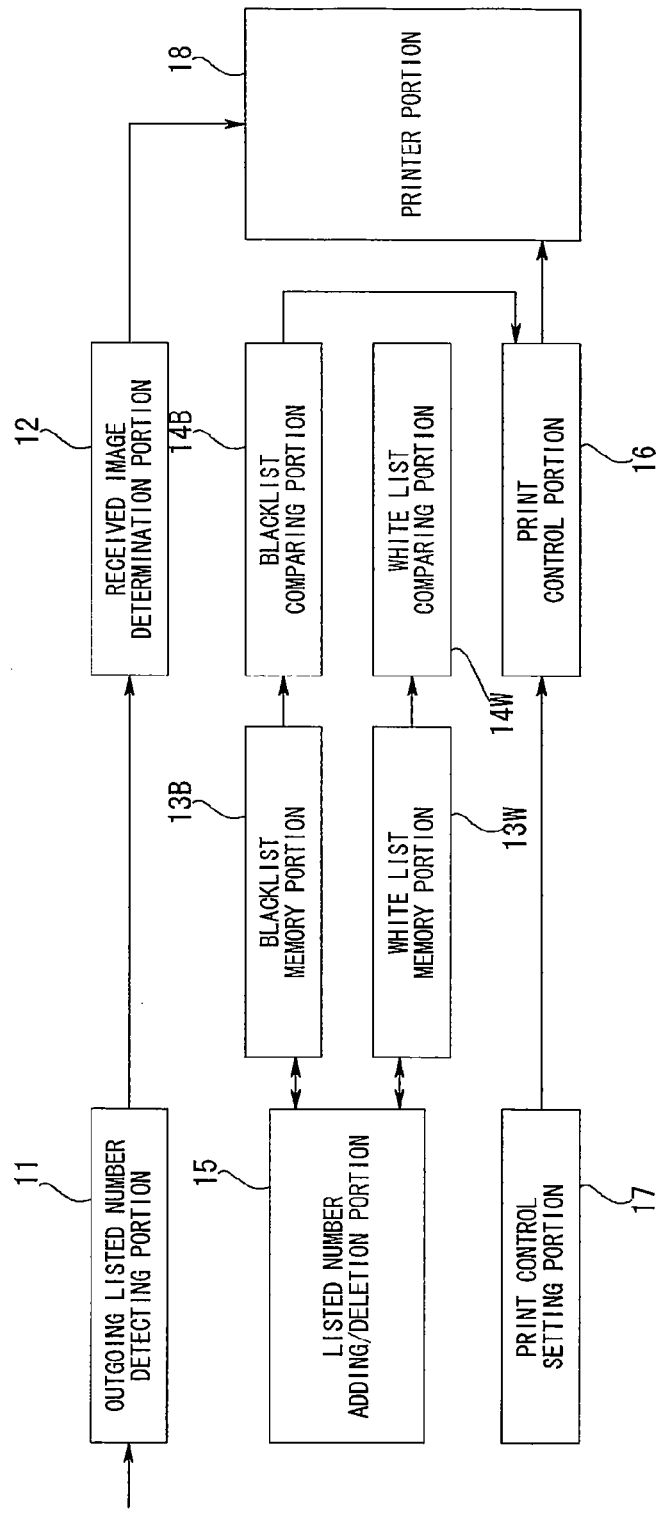
FIG. 1 is a block diagram of a color facsimile apparatus according to a first embodiment of the invention.

Embodiments of the invention will be described below. FIG. 1 illustrates a color facsimile apparatus according to a first embodiment of the invention.

The color facsimile apparatus of the first embodiment includes an outgoing listed number detecting portion 11, a received image determination portion 12, a blacklist memory portion 13B, a blacklist comparing portion 14B, a white list memory portion 13W, a white list comparing portion 14W, a listed number adding/deletion portion 15, a print control portion 16, a print control setting portion 17, and a printer portion 18.

The outgoing listed number detecting portion 11 detects an outgoing listed number of a facsimile signal transmitted through a telephone line. The received image determination portion 12 determines whether a received image is a color image or a monochrome image from the facsimile signal. A blacklist is stored in the blacklist memory portion 13B. The blacklist comparing portion 14B compares the outgoing listed number to listed numbers on the blacklist. A white list is stored in the white list memory portion 13W. The white list comparing portion 14W compares the outgoing listed number to listed numbers on the white list. The listed number adding/deletion portion 15 adds and deletes listed numbers on the blacklist and white list. The print control portion 16 performs predetermined control. The print control setting portion 17 performs setting of the print control portion 16. Under the control of the print control portion 16, the printer portion 18 performs the color print or monochrome print of the received image input through the received image determination portion 12, or the printer portion 18 does not perform the print.

For example, the outgoing listed number detecting portion 11 is a caller ID number display device, and can automatically detect the outgoing listed number of the facsimile signal when the facsimile signal is transmitted through the telephone line.

The blacklist is a list on which confirmed listed numbers such as spam are usually put, and input from the listed number adding/deletion portion 15 as a list on which plural listed numbers are usually put by obtaining information elsewhere. The white list is a list on which reliable listed numbers are put, and can be input from the listed number adding/deletion portion 15 like the blacklist.

Figure 3:
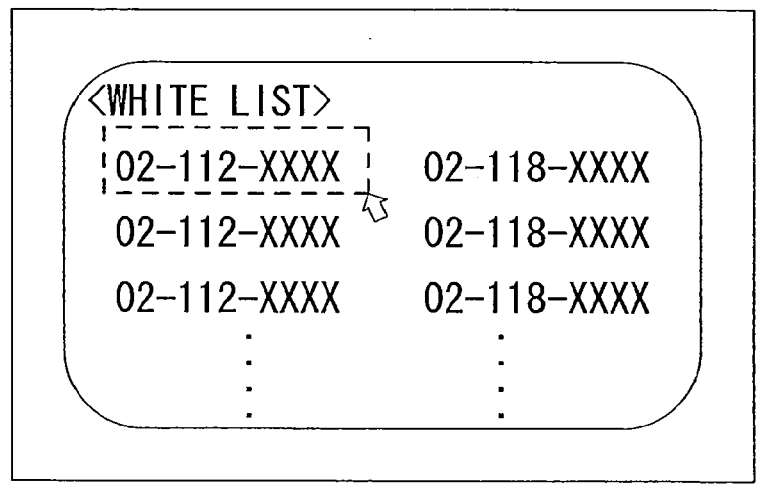
FIG. 3 illustrates an example of a screen on which a white list in the first embodiment is displayed.

For example, the listed number adding/deletion portion 15 includes a display portion, a keyboard, and a mouse. An operator can input the listed number from the keyboard in terms of numerical numbers to add the listed number to the blacklist or white list. For example, as illustrated in FIG. 3, the listed numbers of the white list are displayed on a screen of the display portion, and a deletion key is pressed while one or plural icons whose display and movement are controlled by the mouse are overlapped on specific listed numbers, which allows the listed numbers to be deleted from the white list. The blacklist comparing portion 14B compares the outgoing listed number to listed numbers on the blacklist, and supplies a blacklist match signal when the listed number exists in the listed numbers on the black list. On the other hand, the white list comparing portion 14W compares the outgoing listed number to listed numbers on the white list, and supplies a white list match signal when the listed number exists in the listed number on the white list.

The print control portion 16 follows the setting of the print control setting portion 17. For example, as described below, the print control setting portion 17 performs the setting of the print control portion 16 so as to control the printer portion 18.

The print control portion 16 performs predetermined control in response to the blacklist match signal and the white list match signal. The print control portion 16 performs the control such that the printer portion 18 does not perform print when the blacklist match signal is received, and performs the control such that the printer portion 18 performs predetermined color print when the white list match signal is received, and performs the control such that the printer portion 18 performs monochrome print when neither the blacklist match signal nor white list match signal is received. The operator can also perform input (setting) from the print control setting portion 17 such that the print control portion 16 controls the printer portion 18 in a different way.

Figure 2:
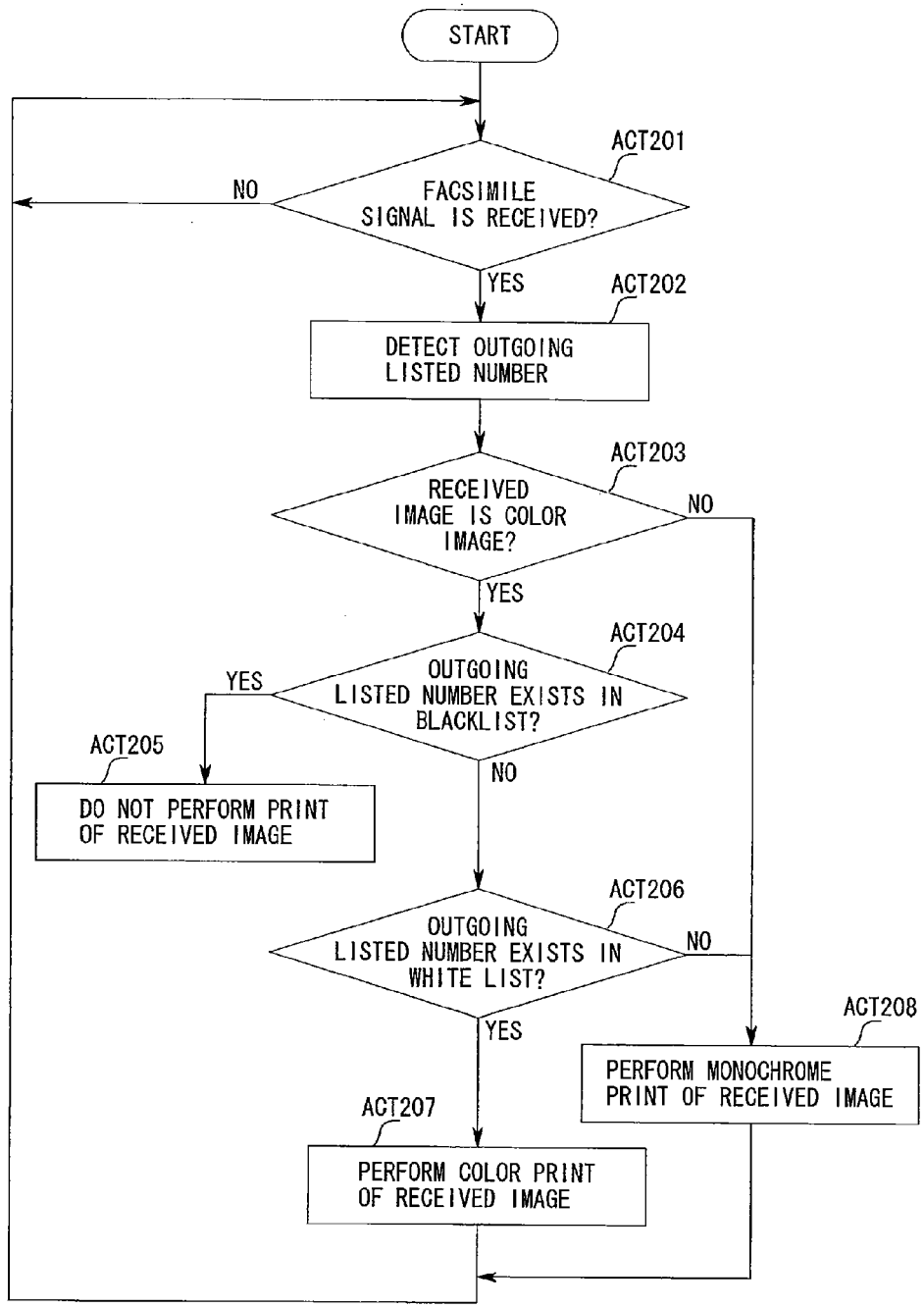
FIG. 2 is a flowchart in the first embodiment.

An operation of the color facsimile apparatus of the first embodiment will be described with reference to a flowchart of FIG. 2. When the color facsimile apparatus is turned on, the color facsimile apparatus waits for the reception of the facsimile signal in ACT201. When the reception of the facsimile signal is detected, in the outgoing listed number detecting portion 11, the caller ID number display device detects the outgoing listed number that transmits the facsimile signal (ACT202).

In ACT203, the received image determination portion 12 detects whether the received image of the received facsimile signal is the color image or the monochrome image. When the received image is the color image, the flow goes to ACT204 to detect whether the outgoing listed number detected in ACT202 exists in the blacklist. In the processing in ACT204, the blacklist comparing portion 14B calls the blacklist stored in the blacklist memory portion 13B, and compares the outgoing listed number to the listed numbers on the blacklist on a one-by-one basis.

When the outgoing listed number is matched with one of the listed numbers on the blacklist, the blacklist comparing portion 14B transmits the blacklist match signal indicating that the outgoing listed number exist in the blacklist to the print control portion 16. Because this means that the outgoing listed number is put on the blacklist, the print control portion 16 transmits a print cancel signal to the printer portion 18. Accordingly, the printer portion 18 does not perform the print of the facsimile signal received through the received image determination portion 12 (ACT205).

On the other hand, when the outgoing listed number is not matched with the listed numbers on the blacklist, the outgoing listed number is transmitted to the white list comparing portion 14W through the blacklist comparing portion 14B. In ACT206, the white list comparing portion 14W checks whether the outgoing listed number is put on the white list. That is, the white list comparing portion 14W reads the white list stored in the white list memory portion 13W, and compares the outgoing listed number to the listed numbers on the white list on a one-by-one basis.

When the outgoing listed number is matched with one of the listed numbers on the white list (YES in ACT206), that is, when the outgoing listed number is put on the white list, the flow goes to ACT207 to perform the color print of the received image. When the outgoing listed number is not matched with any listed numbers on the white list, the flow goes to ACT208 to perform the monochrome print of the received image.

When the received image is not the color image in ACT203, that is, when the received image is the monochrome image, obviously the printer portion 18 performs the monochrome print in ACT208.

Thus, the printer portion 18 does not perform the print in ACT205 when the outgoing listed number exists in the blacklist. The printer portion 18 performs the color print in ACT207 when the outgoing listed number exists in the white list. The printer portion 18 performs the monochrome print in ACT208 when the outgoing listed number does not exist in the white list.

In the first embodiment, the print is not performed when the outgoing listed number is put on the blacklist. Alternatively, in such cases, the reception of the facsimile signal may be rejected.

In the first embodiment, the print job of the color facsimile apparatus is classified into the non-print, the color print, and the monochrome print based on whether the outgoing listed number is put on the blacklist or the white list. However, the classification of the print job is not limited to the first embodiment. For example, the number of received images is also included in the determination condition by the setting of the print control setting portion 17, the color print is performed until the number of received images reaches a predetermined number, and the monochrome print is performed after that.

In the first embodiment, first the determination whether the listed number is put on the blacklist is made, and the received image is not printed when the listed number is put on the blacklist. Alternatively, even if the listed number of the received image is not put on the blacklist at first, when the received image is determined to be unnecessary after the received image is printed several times, the operator may input the listed number at that time from the listed number adding/deletion portion 15 to put the listed number on the blacklist.

In such cases, because the listed number of the received image is already stored in the color facsimile apparatus, the reception record list may be displayed on the screen of the listed number adding/deletion portion 15 so as to add the listed number. The listed number may be added to the white list in the similar way.

For the small number of received images, even if the list is not displayed, a blacklist adding button and a white list adding button are provided, and the outgoing listed number of the received image may be added to the blacklist or the white list by pressing the blacklist adding button or the white list adding button.

According to the first embodiment, advantageously the print is not performed when the facsimile signal is transmitted from the listed number on the blacklist. When the facsimile signal is transmitted from the listed number on the blacklist, the reception of the facsimile signal may be rejected to transmit the rejection to the outgoing listed number.

In the invention, the color facsimile apparatus may possess no blacklist when the listed number whose print should clearly be rejected is unknown. In the invention, the color print may be performed up to a predetermined number according to the number of images of the transmitted file, and the monochrome print may be performed when the number of images exceeds the predetermined number.

The color facsimile apparatus does not possess the blacklist, and the color print is performed only to all the listed numbers on the white list, that is, all the listed numbers to be received, and the monochrome print may be performed to other listed numbers when the number of images exceeds the predetermined number.

Figure 4:
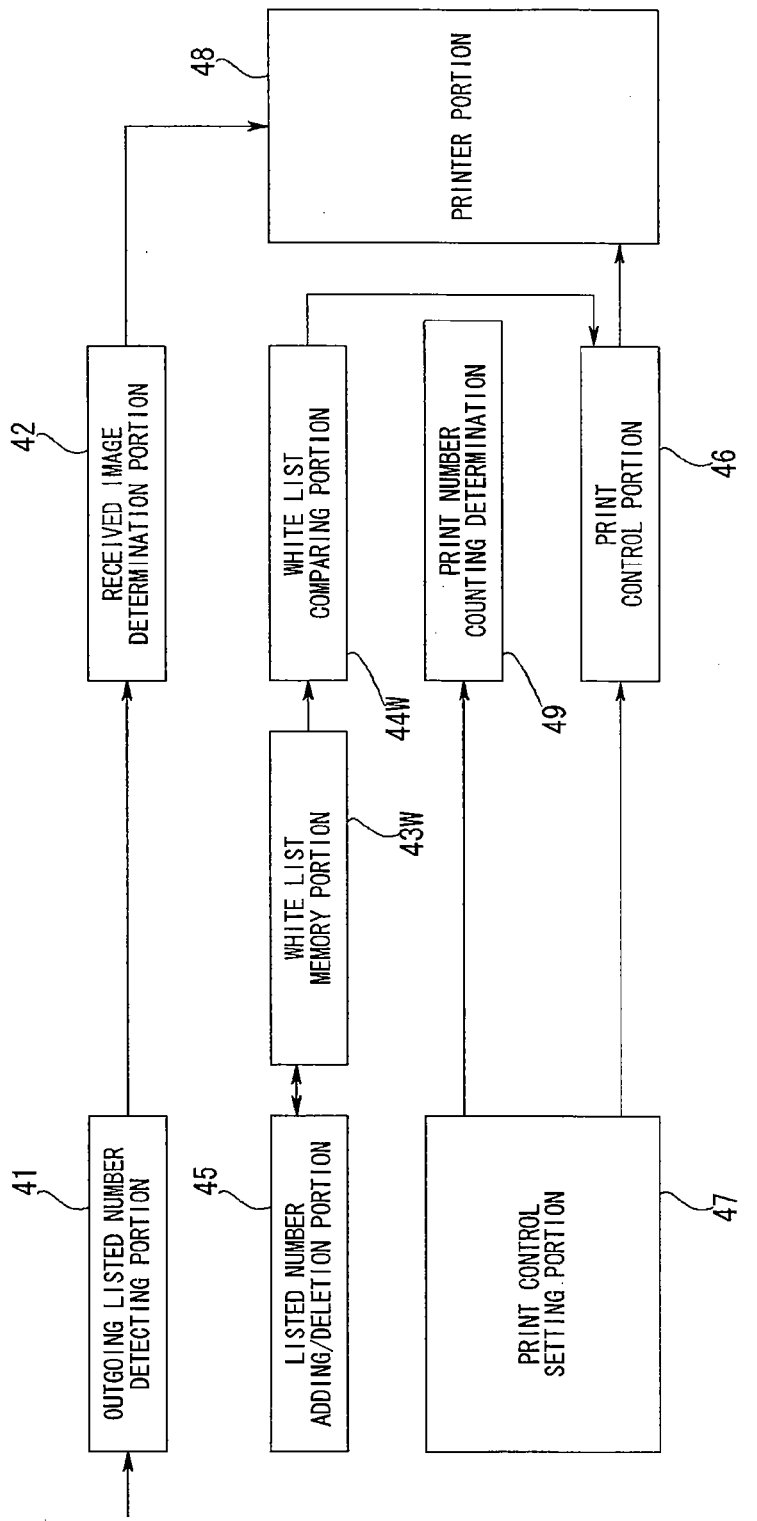
FIG. 4 is a block diagram of a color facsimile apparatus according to a second embodiment of the invention.

A color facsimile apparatus according to a second embodiment of the invention will be described with reference to FIGS. 4 and 5. The color facsimile apparatus of the second embodiment includes an outgoing listed number detecting portion 41 that detects the outgoing listed number, a received image determination portion 42 that determines whether the received image is the color image or the monochrome image, a white list memory portion 43W in which the white list is stored, a white list comparing portion 44W that compares the outgoing listed number to listed numbers on the white list stored in the white list memory portion 43W, a listed number adding/deletion portion 45 that adds the listed number to the white list stored in the white list memory portion 43W or deletes the listed number from the white list, a print number counting determination portion 49 that determines whether the number of received images exceeds a predetermined number, a print control portion 46 that control the print, a print control setting portion 47 that performs the settings of the print control portion 46 and the print number counting determination portion 49, and printer portion 48 that prints the received image input through the received image determination portion 42 under the control of the print control portion 46.

The print control setting portion 47 performs the setting of the print control portion 46, and sets a color specifying print number for specifying how many color prints are made from the start up to, for example, three color prints sheet when the outgoing listed number does not exist in the white list.

The outgoing listed number detecting portion 41, the received image determination portion 42, the white list memory portion 43W, the white list comparing portion 44W, the listed number adding/deletion portion 45, the print control portion 46, the print control setting portion 47, and the printer portion 48 have the functions similar to those of the outgoing listed number detecting portion 11, the received image determination portion 12, the white list memory portion 13W, the white list comparing portion 14W, the listed number adding/deletion portion 15, the print control portion 16, the print control setting portion 17, and the printer portion 18 of FIG. 1.

Figure 5:
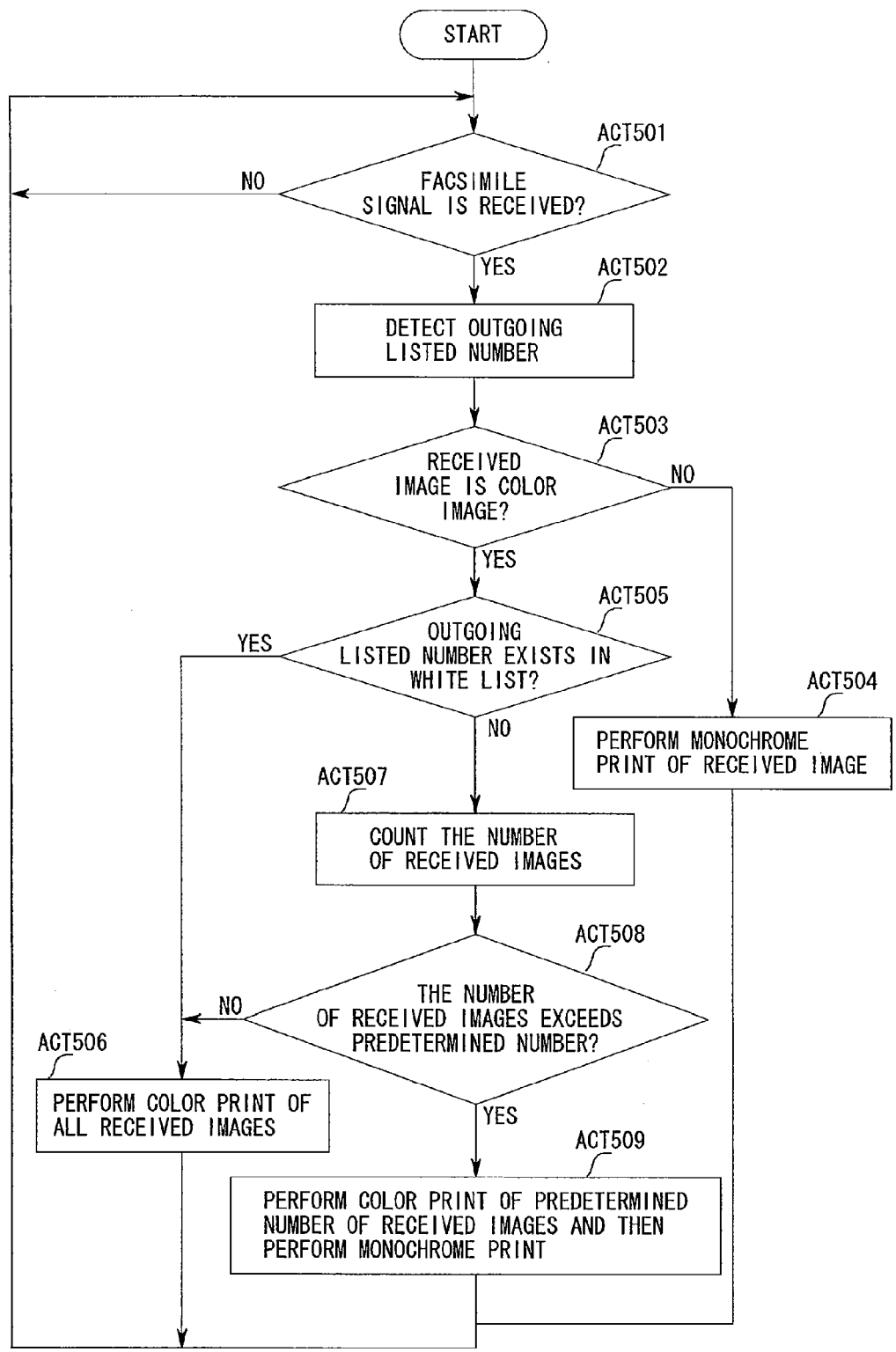
FIG. 5 is a flowchart in the second embodiment.

Referring to FIG. 5, in ACT501, the reception of the facsimile signal is monitored. When the facsimile signal is received, the outgoing listed number detecting portion 41 detects the outgoing listed number in ACT502, and the received image determination portion 42 determines whether the received image is the color image or the monochrome image in ACT503. When the received image is determined to be the monochrome image, the monochrome print of the received image is performed as usual in ACT504. On the other hand, when the received image determination portion 42 determines that the received image is the color image, the white list comparing portion 44W detects whether the outgoing listed number exists in the white list in ACT505. Specifically, the white list comparing portion 44W reads the white list stored in the white list memory portion 43W, and compares the outgoing listed number to the listed numbers on the white list, thereby searching whether the outgoing listed number exist in the listed numbers on the white list.

When the outgoing listed number exists in the white list in ACT505, the color print is performed to all the received images in ACT506.

When the outgoing listed number does not exist in the white list in ACT505, the flow goes to ACT507, and the print number counting determination portion 49 counts the number of received images. Then, in ACT508, the print number counting determination portion 49 determines whether the number of received images exceeds a predetermined number. When the number of received images is equal to or lower than the predetermined number, the flow goes to ACT506, and the color print is performed to all the received images. On the other hand, when the number of received images exceeds the predetermined number in ACT508, the flow goes to ACT509. In ACT509, the monochrome print is performed after the color print of the received image is performed up to the predetermined number.

After the print is performed in ACT504, ACT506, and ACT509, the flow returns to ACT501 to wait for the next facsimile signal.

In the color facsimile apparatus of the second embodiment, even if the facsimile signal of a large amount of received images is transmitted from the outgoing listed number that is not put on the white list, advantageously the high cost color print is not performed, and a large amount of color ink is not used.

Because the memory portion in which the blacklist is stored and the blacklist comparing portion that compares the outgoing listed number to the listed numbers on the blacklist are eliminated in the second embodiment, advantageously the circuit configuration can be simplified.

The present invention is not limited to the first and second embodiments, but various modifications can be made. The modifications are included in the present invention as long as the technical thought of the invention is utilized.

What is claimed is:
1. A color facsimile apparatus comprising:
  a printer portion that performs color printing and monochrome printing of a received image included in a facsimile signal transmitted from an outgoing listed number;
  an outgoing detecting portion that receives the facsimile signal to detect the outgoing listed number;

an image determination portion that determines whether the received image included in the facsimile signal is a color image or a monochrome image;
a first list comparing portion that compares the outgoing listed number to numbers on a previously stored first list to determine whether the outgoing listed number exists in the first list;
a print number determination portion that counts a number of pages of the color image if the received image is a color image; and
a print control portion that controls the printer portion based on an output of the print number determination portion and an output of the first list comparing portion.

2. The apparatus according to claim 1, wherein the print control portion controls the printer portion to perform color printing of all of the pages of the color image when the outgoing listed number is determined to exist in the first list.

3. The apparatus according to claim 1, wherein, when the outgoing listed number is determined to not exist in the first list, the print control portion controls the printer portion to perform color printing of pages of the color image up to a predetermined print number and to perform monochrome printing of pages of the color image exceeding the predetermined print number.

4. The apparatus according to claim 1, further comprising:
a first list memory portion in which the first list is stored; and
a listed number adding/deletion portion that adds one or more numbers to the first list stored in the first list memory portion and deletes one or more numbers from the first list stored in the first list memory portion.

5. A color facsimile apparatus comprising:
a printer portion that performs color printing and monochrome printing of a received image included in a facsimile signal transmitted from an outgoing listed number;
an outgoing detecting portion that receives the facsimile signal to detect the outgoing listed number;
an image determination portion that determines whether the received image included in the facsimile signal is a color image or a monochrome image;
a first list comparing portion that compares the outgoing listed number to numbers on a previously stored first list to determine whether the outgoing listed number exists in the first list;
a second list comparing portion that compares the outgoing listed number to numbers on a previously stored second list to determine whether the outgoing listed number exists in the second list; and
a print control portion that controls the printer portion based on an output of the first list comparing portion and an output of the second list comparing portion.

6. The apparatus according to claim 5, wherein the print control portion controls the printer portion such that neither color printing nor monochrome printing is performed when the outgoing listed number is determined to exist in the second list.

7. The apparatus according to claim 5, wherein the print control portion controls the printer portion such that the color print is performed when the outgoing listed number is determined to exist in the first list.

8. The apparatus according to claim 5, wherein the print control portion controls the printer portion to perform monochrome printing when the outgoing listed number is determined to not exist in neither of the first list and the second list.

9. The apparatus according to claim 5, further comprising:
a first list memory portion in which the first list is stored;
a second list memory portion in which the second list is stored; and
a listed number adding/deletion portion that adds one or more numbers to the first list stored in the first list memory portion, adds one or more numbers to the second list stored in the second list memory portion, deletes one or more numbers from the first list stored in the first list memory portion, and deletes one or more numbers from the second list stored in the second list memory portion.

* * * * *